United States Patent
Zheng et al.

(10) Patent No.: US 9,516,341 B2
(45) Date of Patent: Dec. 6, 2016

(54) METHODS AND APPARATUS FOR REDUCED COMPLEXITY TEMPLATE MATCHING PREDICTION FOR VIDEO ENCODING AND DECODING

(75) Inventors: Yunfei Zheng, San Diego, CA (US); Peng Yin, Ithaca, NY (US); Xiaoan Lu, Princeton, NJ (US); Qian Xu, Folsom, CA (US); Joel Sole, La Jolla, CA (US)

(73) Assignee: THOMSON LICENSING, Issy les Moulineaux (FR)

( * ) Notice: Subject to any disclaimer, the term of this patent is extended or adjusted under 35 U.S.C. 154(b) by 921 days.

(21) Appl. No.: 13/522,347

(22) PCT Filed: Jan. 19, 2011

(86) PCT No.: PCT/US2011/000098
§ 371 (c)(1),
(2), (4) Date: Jul. 16, 2012

(87) PCT Pub. No.: WO2011/090783
PCT Pub. Date: Jul. 28, 2011

(65) Prior Publication Data
US 2012/0320983 A1    Dec. 20, 2012

Related U.S. Application Data

(60) Provisional application No. 61/296,329, filed on Jan. 19, 2010.

(51) Int. Cl.
*H04N 7/32* (2006.01)
*H04N 19/57* (2014.01)
(Continued)

(52) U.S. Cl.
CPC ........... *H04N 19/57* (2014.11); *H04N 19/103* (2014.11); *H04N 19/105* (2014.11);
(Continued)

(58) Field of Classification Search
CPC .. H04N 19/56; H04N 19/105; H04N 19/176; H04N 19/70; H04N 19/46; H04N 19/57; H04N 19/117; H04N 19/186; H04N 19/174; H04N 19/523; H04N 19/103
USPC .................................................... 375/240.16
See application file for complete search history.

(56) References Cited

U.S. PATENT DOCUMENTS

2004/0120401 A1*  6/2004  Linzer et al. ............ 375/240.16
2006/0233258 A1  10/2006  Holcomb
(Continued)

FOREIGN PATENT DOCUMENTS

EP    1073276    1/2001
EP    1431917    6/2004
(Continued)

OTHER PUBLICATIONS

Kamp et al. "Fast Decoder Side Motion Vector Derivation for Inter Frame Video Coding". PCS 2009, pp. 1-4.*
(Continued)

*Primary Examiner* — Christopher S Kelley
*Assistant Examiner* — Zhihan Zhou
(74) *Attorney, Agent, or Firm* — Brian J. Dorini; Ronald J. Kolczynski

(57) ABSTRACT

There are provided methods and apparatus for reduced complexity template matching prediction for video encoding and decoding. The encoding method encodes at least an image block in a picture using template matching prediction, wherein the template matching prediction is selectably constrained using one or more constraining criterion that reduces a complexity of performing the template matching prediction.

37 Claims, 6 Drawing Sheets

(51) Int. Cl.
| | |
|---|---|
| *H04N 19/56* | (2014.01) |
| *H04N 19/105* | (2014.01) |
| *H04N 19/176* | (2014.01) |
| *H04N 19/70* | (2014.01) |
| *H04N 19/46* | (2014.01) |
| *H04N 19/103* | (2014.01) |
| *H04N 19/117* | (2014.01) |
| *H04N 19/186* | (2014.01) |
| *H04N 19/174* | (2014.01) |
| *H04N 19/523* | (2014.01) |

(52) U.S. Cl.
CPC ......... *H04N 19/117* (2014.11); *H04N 19/174* (2014.11); *H04N 19/176* (2014.11); *H04N 19/186* (2014.11); *H04N 19/46* (2014.11); *H04N 19/523* (2014.11); *H04N 19/56* (2014.11); *H04N 19/70* (2014.11)

(56) References Cited

U.S. PATENT DOCUMENTS

| | | | |
|---|---|---|---|
| 2007/0189390 A1* | 8/2007 | Pappas et al. | 375/240.16 |
| 2009/0116760 A1 | 5/2009 | Boon et al. | |
| 2010/0091846 A1 | 4/2010 | Suzuki et al. | |
| 2011/0103486 A1 | 5/2011 | Sato et al. | |
| 2011/0176614 A1 | 7/2011 | Sato et al. | |
| 2011/0261886 A1 | 10/2011 | Suzuki et al. | |
| 2012/0320976 A1 | 12/2012 | Suzuki et al. | |

FOREIGN PATENT DOCUMENTS

| | | | |
|---|---|---|---|
| EP | 2091258 | | 8/2009 |
| EP | 2091258 A1 * | | 8/2009 |
| JP | 2007-043651 | | 2/2007 |
| JP | 2007300380 | | 11/2007 |
| JP | 2008300943 A | | 12/2008 |
| WO | WO 2008067734 A1 * | | 6/2008 |
| WO | WO2008126843 A1 | | 10/2008 |
| WO | WO2009131075 A1 | | 10/2009 |
| WO | WO2010001916 | | 1/2010 |
| WO | WO2010001918 A1 | | 1/2010 |

OTHER PUBLICATIONS

Huang et al., "TE1: Decoder-Side Motion Vector Derivatin wih Switchable Template Matching", JCT-VC of ITU-T SG16 WP3 and ISO/IEC JTC1/SC29/WG11, Document: JCTVC-B076, 2nd Meeting: Geneva, CH, Jul. 21-28, 2010, 11 pages.

Jung et al., "RD-Optimized Competition Scheme for Efficient Motion Prediction", Visual Communications and Image Processing 2007, San Jose, Jan. 30-Feb. 1, 2007, pp. 2-6.

Kamp et al., "Description of Video Coding Technology Proposal by RWTH Aachen University", JCT-VC of ITU-T SG16 WP3 and ISO/IEC JTC1/SC29/WG11, Document: JCTVC-A112, 1st Meeting: Dresden, DE, Apr, 15-23, 2010, 23 pages.

Kamp et al., "Fast Decoder Side Motion Vector Derivation for Inter Frame Video Coding", Picture Coding Symposium, May 6, 2009-May 8, 2009, 4 pages.

Karczewicz et al., "Video Coding Technology Proposal by Qualcomm Inc.," JCT-VC of ITU-T SG16 WP3 and ISO/IEC JTC1/SC29/WG11, Document: JCTVC-A121, 1st Meeting: Dresden, DE, Apr. 15-23, 2010, 25 pages.

Shen et al., "Benefits of Adaptive Motion Accuracy in H.26l. Video Coding", IEEE International Conference on Image Processing, vol. 1, Sep. 10, 2000-Sep. 13, 2000, pp. 1012-1015.

Tan et al., "Intra Prediction by Template Matching", IEEE International Conference on Image Processing, 2006, Oct. 8-11, 2006, pp. 1693-1696.

Girod, "Efficiency Analysis of Multihypothesis Motion-Compensated Prediction for Video Coding", IEEE Transactions on Image Processing, vol. 9, No. 2, Feb. 2000, 11 pages.

ITU-T H.264 Standard, "Advanced Video Coding or Generic Audiovisual Services", International Telecommunication Union, Mar. 2005, 343 pages.

Suzuki et al., "Inter Frame Coding with Template Matching Averaging", IEEE International Conference on Image Processing 2007 (ICIP 2007), vol. 3, Sep. 16, 2007-Oct. 19, 2007, pp. III-409 to III-412.

Wedi, "Advanced Motion Compensated Prediction Methods", ITU-T Video Coding Experts Group (ITU-T SG16 Q.6), Document: VCEG-X10, 24th Meeting: Palma de Mallorca, Oct. 18-22, 2003, 8 pages.

Tan, "Intra Prediction by Averaged Template Matching Predictors," IEEE Consumer Communications and Networking Conference, Jan. 11, 2007, pp. 405-409.

PCT International Search Report dated Apr. 11, 2011.

* cited by examiner

METHODS AND APPARATUS FOR REDUCED COMPLEXITY TEMPLATE MATCHING PREDICTION FOR VIDEO ENCODING AND DECODING

CROSS-REFERENCE TO RELATED APPLICATIONS

This application claims the benefit, under 35 U.S.C. §365 of International Application PCT/US2011/000098, filed 19 Jan. 2011, which was published in accordance with PCT Article 21(2) on 28 Jul. 2011 in English and which claims the benefit of U.S. provisional patent application No. 61/296,329, filed 19 Jan. 2010.

TECHNICAL FIELD

The present principles relate generally to video encoding and decoding and, more particularly, to methods and apparatus for reduced complexity template matching prediction for video encoding and decoding.

BACKGROUND

Sub-pel motion compensation is used widely in current video encoders and decoders. For example, in the International Organization for Standardization/International Electrotechnical Commission (ISO/IEC) Moving Picture Experts Group-4 (MPEG-4) Part 10 Advanced Video Coding (AVC) Standard/International Telecommunication Union, Telecommunication Sector (ITU-T) H.264 Recommendation (hereinafter the "MPEG-4 AVC Standard"), motion compensation up to a quarter-pel precision is used. Such a scheme is referred to herein as the "first prior art approach". Turning to FIG. 1, the upsampling of a frame by a factor of 4 (for ¼-pel vectors) in accordance with the MPEG-4 AVC Standard is indicated generally by the reference numeral 100. The upsampling involves first applying a 6-tap Wiener filter for half-pel generation and then applying a bilinear filter for quarter-pel generation.

A second prior art approach proposed by the Video Coding Experts Group (VCEG) involves using ⅛-pel compensation to further improve coding efficiency for sequences with aliasing artifacts. In addition to using fixed interpolation filters, in order to better handle aliasing, quantization and motion estimation errors, camera noise, and so forth, adaptive interpolation schemes has been considered. An adaptive interpolation scheme estimates the interpolation filter coefficients on the fly for each sub-pel position to increase the coding efficiency. Taking all the complicated interpolation schemes into consideration, it does not make sense to interpolate all the reference frames and store such interpolated frames with sub-pel precision at the decoder, since only a few sub-pel positions have to be interpolated. Such a scheme will likely result in high memory consumption and high computation complexity at the decoder. One way of performing motion compensation on the fly at the decoder is as performed by the Key Technology Area (KTA) software improvements over the MPEG-4 AVC Standard.

Template matching prediction (TMP) is a technique used to gain coding efficiency for both inter and intra prediction by avoiding transmission of motion/displaced information (motion vectors, reference index, and displaced vectors). Template matching prediction is based on the assumption that there exist a lot of repetitive patterns in video pictures. Hence, template matching searches the similar patterns through the decoded video pictures by matching the neighboring pixels. The final prediction is, in general, the average of several best matches. Template matching can be used in both inter and intra predictions. However, the disadvantage of template matching prediction is that the same search has to be performed at both the encoder and decoder. Thus, template matching prediction can significantly increase the decoder complexity.

Template Matching Prediction in Inter Prediction

Template matching prediction in inter prediction is one way to predict target pixels without sending motion vectors. Given a target block of a frame, a target pixel in the block is determined by finding an optimum pixel from a set of reference samples, where the adjacent pixels of the optimum pixels have the highest correlation with those of the target pixels. Those adjacent pixels of the target pixels are called the template. In the prior art, the template is usually taken from the reconstructed surrounding pixels of the target pixels. Turning to FIG. 2, an example of a template matching prediction scheme for inter prediction is indicated generally by the reference numeral 200. The template matching prediction scheme 200 involves a reconstructed reference frame 210 having a search region 211, a prediction 212 within the search region 211, and a neighborhood 213 with respect to the prediction 212. The template matching prediction scheme 200 also involves a current frame 250 having a target block 251, a template 252 with respect to the target block 251, and a reconstructed region 253. In the case of inter-prediction, the template matching process can be seen as a motion vector search at the decoder side. Here, template matching is performed very similar to traditional motion estimation techniques. Namely, motion vectors are evaluated by calculating a cost function for accordingly displaced template-shaped regions in the reference frames. The best motion vector for the template is then used to predict the target area. Only those areas of the image where a reconstruction or at least a prediction signal already exists are accessed for the search. Thus, the decoder is able to execute the template matching process and predict the target area without additional side information.

Template matching can predict pixels in a target block without transmission of motion vectors. It is expected that the prediction performance of template matching prediction is comparable to that of the traditional block matching scheme if the correlation between a target block and its template is high. In the prior art, the template is taken from the reconstructed spatial neighboring pixels of the target pixels. The neighboring pixels sometimes have low correlations with the target pixels. Thus, the performance of template matching prediction can be lower than the traditional block matching scheme.

Template Matching Prediction in Intra Prediction

In intra prediction, template matching is one of the available non-local prediction approaches, since the prediction could be generated by the pixels far away from the target block. In intra template matching, the template definition is similar to that in inter template matching. However, one difference is that the search range is limited to the decoded part of the current picture. Turning to FIG. 3, an example of a template matching prediction scheme for intra prediction is indicated generally by the reference numeral 300. The template matching prediction scheme 300 involves a decoded part 310 of a picture 377. The decoded part 310 of the picture 377 has a search region 311, a candidate prediction 312 within the search region 311, and a neighborhood 313 with respect to the candidate prediction 312. The template matching prediction scheme 300 also involves an un-decoded part 320 of the picture 377. The un-decoded part 320 of the picture 377 has a target block 321, a template 322 with respect to the target block 321. For simplicity, the following description is based on intra template matching. However, it is appreciated by one of ordinary skill in this and related arts that the inter template counterpart can be readily extended.

A problem associated with template matching prediction at the decoder is that because template matching needs to perform searching at the decoder and performs such searching without requiring any constraints, there is a need to perform sub-pel interpolation for all of the reference frames and to store such interpolated frames with sub-pel precision at the decoder, despite the fact that only a few sub-pel positions have to be interpolated. This may add considerably complexity including, for example, memory and computation complexity at the decoder.

SUMMARY

These and other drawbacks and disadvantages of the prior art are addressed by the present principles, which are directed to methods and apparatus for reduced complexity template matching prediction for video encoding and decoding.

According to an aspect of the present principles, there is provided an apparatus. The apparatus includes a video encoder for encoding at least an image block in a picture using template matching prediction. The template matching prediction is selectably constrained using one or more constraining criterion that reduces a complexity of performing the template matching prediction.

According to another aspect of the present principles, there is provided a method in a video encoder. The method includes encoding at least an image block in a picture using template matching prediction. The template matching prediction is selectably constrained using one or more constraining criterion that reduces a complexity of performing the template matching prediction.

According to yet another aspect of the present principles, there is provided an apparatus. The apparatus includes a video decoder for decoding at least an image block in a picture using template matching prediction. The template matching prediction is selectably constrained using one or more constraining criterion that reduces a complexity of performing the template matching prediction.

According to still another aspect of the present principles, there is provided a method in a video decoder. The method includes decoding at least an image block in a picture using template matching prediction. The template matching prediction is selectably constrained using one or more constraining criterion that reduces a complexity of performing the template matching prediction.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

Figure 1:
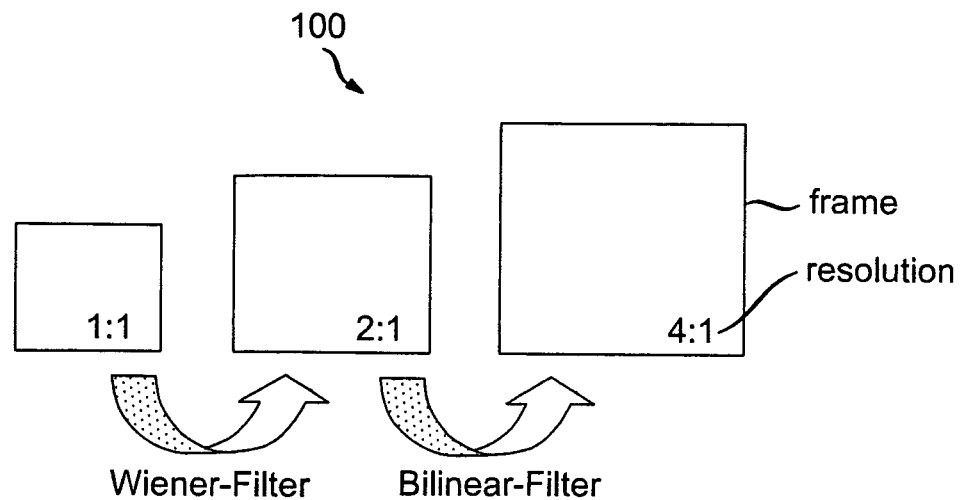
FIG. 1 is a diagram showing the upsampling of a frame by a factor of 4 (for ¼-pel vectors) in accordance with the MPEG-4 AVC Standard.
Figure 2:
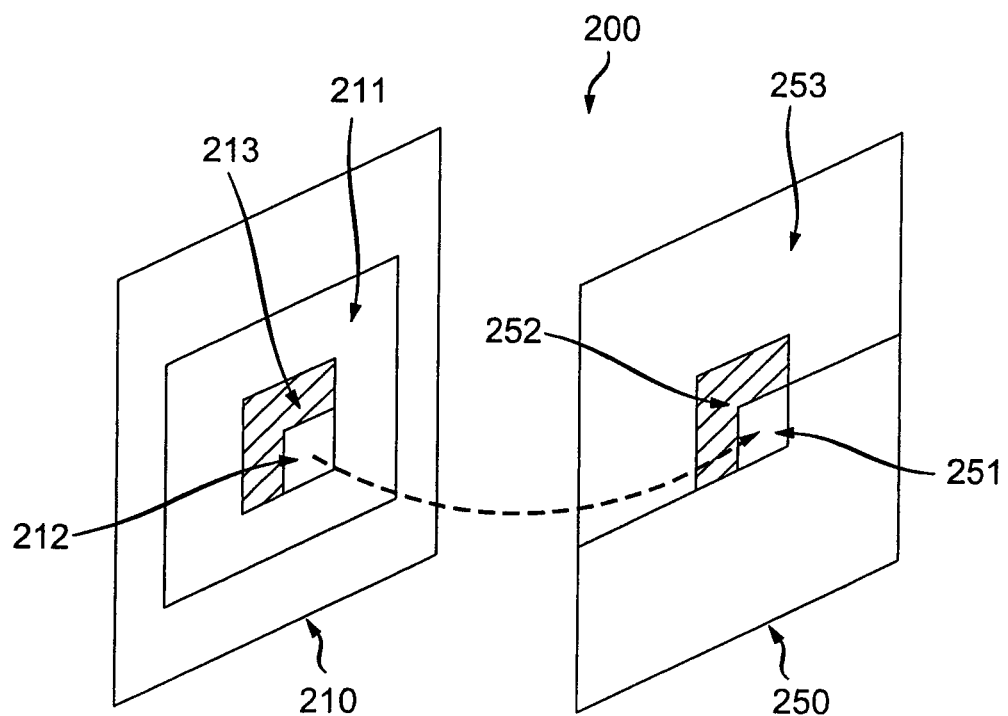
FIG. 2 is a diagram showing an example of a template matching prediction scheme for inter prediction.
Figure 3:
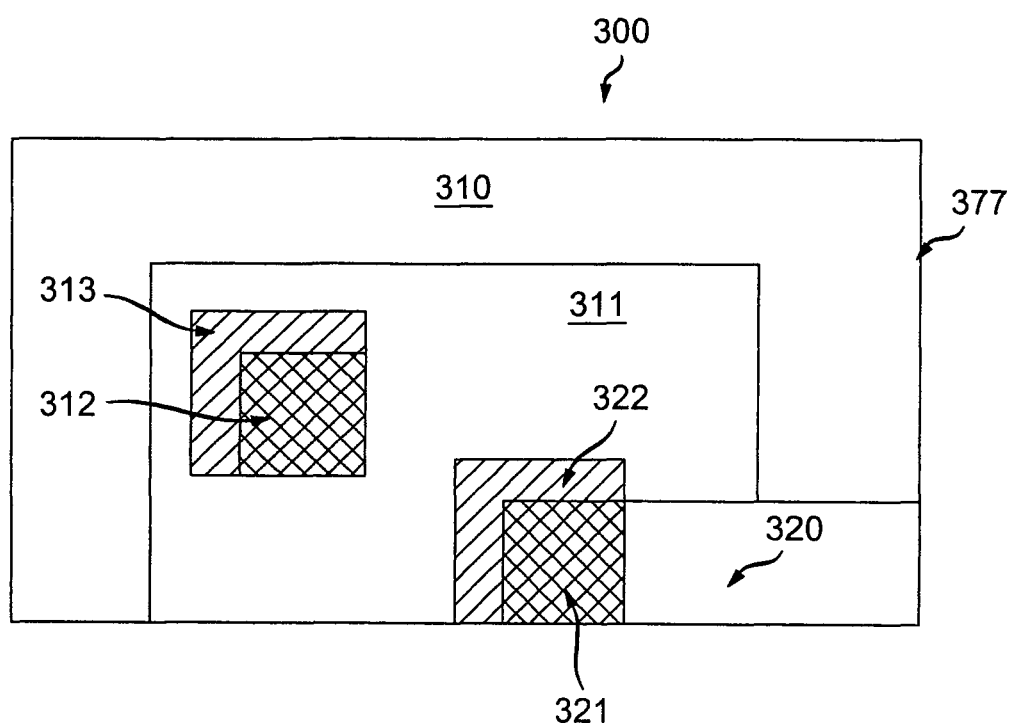
FIG. 3 is a diagram showing an example of a template matching prediction scheme for intra prediction.

The present principles are directed to methods and apparatus for reduced complexity template matching prediction for video encoding and decoding.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Also, as used herein, the words "picture" and "image" are used interchangeably and refer to a still image or a picture from a video sequence. As is known, a picture may be a frame or a field.

Additionally, as used herein, the word "signal" refers to indicating something to a corresponding decoder. For example, the encoder may signal a particular type of search (integer search, half-pel search, or quarter-pel search) and/or a search range (neighboring motion vectors, small search range, or large search range), and/or a filter type (bilinear filter or same interpolation filter as used in standard motion compensation) in order to make the decoder aware of which particular type of search and/or search range and/or filter type used on the encoder side. In this way, the same type of search and/or search range and/or filter type may be used at both the encoder side and the decoder side. It is to be appreciated that signaling may be accomplished in a variety of ways. For example, one or more syntax elements, flags, and so forth may be used to signal information to a corresponding decoder.

Moreover, as used herein, the phrases "standard motion compensation" and "standard motion estimation" refer to motion compensation and motion estimation, respectively, where such compensation or estimation is performed according to an existing video coding standard and/or an existing video coding recommendation (as opposed to the present principles). Thus, for example, the phrase "standard motion estimation" may be used to refer to the conventional motion estimation process performed by, for example, the MPEG-4 AVC Standard. Also, we note that the phrases "phrases "standard motion compensation" and "regular motion compensation are used interchangeably herein, and the phrases "standard motion estimation" and "regular motion estimation" as used interchangeably herein. As is known, motion estimation is the process of determining motion vectors that describe a transformation from one two-dimensional image to another two-dimensional image, usually from adjacent frames in a video sequence.

Figure 4:
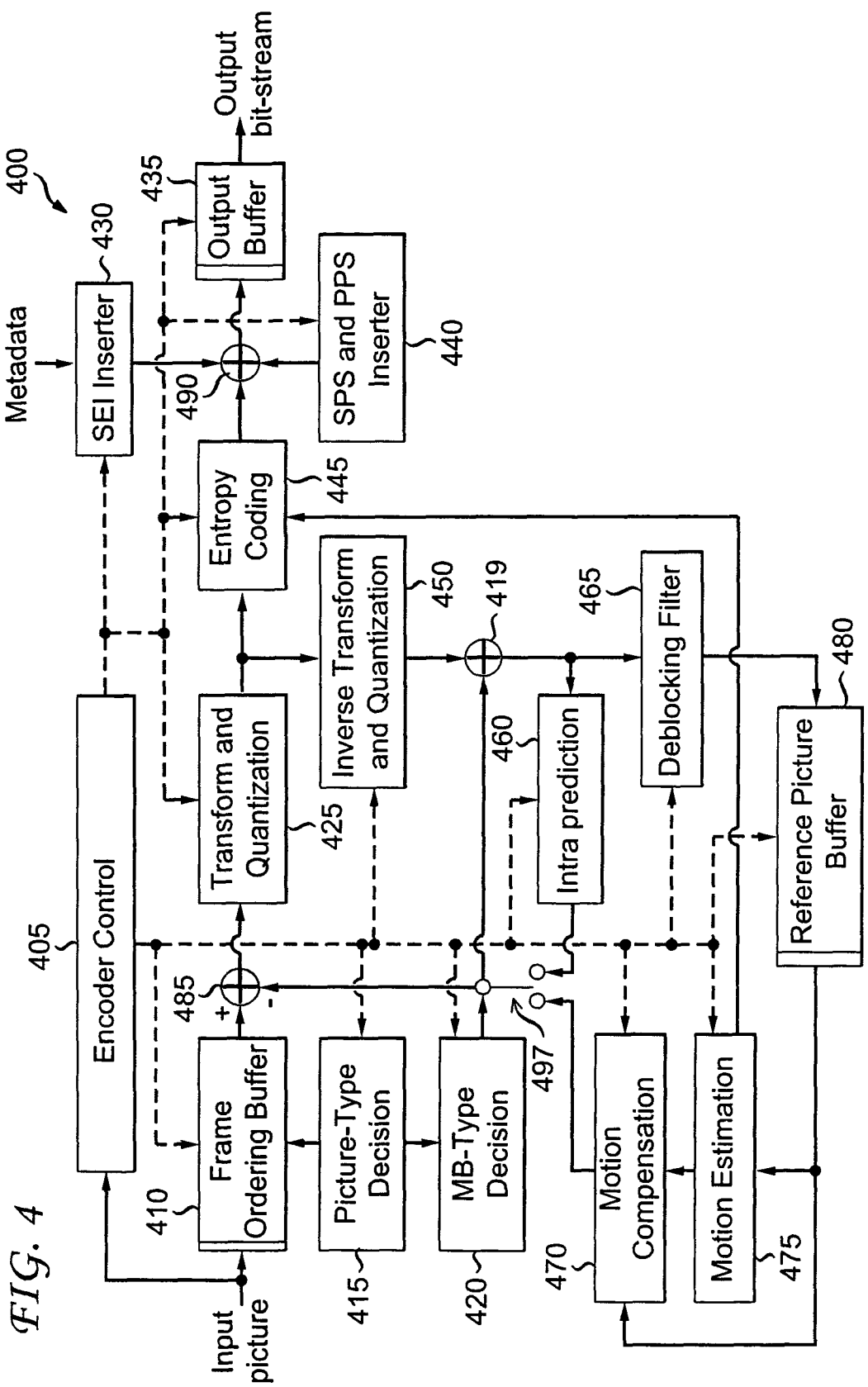
FIG. 4 is a block diagram showing an exemplary video encoder to which the present principles may be applied, in accordance with an embodiment of the present principles.

Turning to FIG. 4, an exemplary video encoder to which the present principles may be applied is indicated generally by the reference numeral 400. The video encoder 400 includes a frame ordering buffer 410 having an output in signal communication with a non-inverting input of a combiner 485. An output of the combiner 485 is connected in signal communication with a first input of a transformer and quantizer 425. An output of the transformer and quantizer 425 is connected in signal communication with a first input of an entropy coder 445 and a first input of an inverse transformer and inverse quantizer 450. An output of the entropy coder 445 is connected in signal communication with a first non-inverting input of a combiner 490. An output of the combiner 490 is connected in signal communication with a first input of an output buffer 435.

A first output of an encoder controller 405 is connected in signal communication with a second input of the frame ordering buffer 410, a second input of the inverse transformer and inverse quantizer 450, an input of a picture-type decision module 415, a first input of a macroblock-type (MB-type) decision module 420, a second input of an intra prediction module 460, a second input of a deblocking filter 465, a first input of a motion compensator 470, a first input of a motion estimator and template matching prediction module 475, and a second input of a reference picture buffer 480.

A second output of the encoder controller 405 is connected in signal communication with a first input of a Supplemental Enhancement Information (SEI) inserter 430, a second input of the transformer and quantizer 425, a second input of the entropy coder 445, a second input of the output buffer 435, and an input of the Sequence Parameter Set (SPS) and Picture Parameter Set (PPS) inserter 440.

An output of the SEI inserter 430 is connected in signal communication with a second non-inverting input of the combiner 490.

A first output of the picture-type decision module 415 is connected in signal communication with a third input of the frame ordering buffer 410. A second output of the picture-type decision module 415 is connected in signal communication with a second input of a macroblock-type decision module 420.

An output of the Sequence Parameter Set (SPS) and Picture Parameter Set (PPS) inserter 440 is connected in signal communication with a third non-inverting input of the combiner 490.

An output of the inverse quantizer and inverse transformer 450 is connected in signal communication with a first non-inverting input of a combiner 419. An output of the combiner 419 is connected in signal communication with a first input of the intra prediction module 460 and a first input of the deblocking filter 465. An output of the deblocking filter 465 is connected in signal communication with a first input of a reference picture buffer 480. An output of the reference picture buffer 480 is connected in signal communication with a second input of the motion estimator and template matching prediction module 475 and a third input of the motion compensator 470. A first output of the motion estimator and template matching prediction module 475 is connected in signal communication with a second input of the motion compensator 470. A second output of the motion estimator and template matching prediction module 475 is connected in signal communication with a third input of the entropy coder 445.

An output of the motion compensator 470 is connected in signal communication with a first input of a switch 497. An output of the intra prediction module 460 is connected in signal communication with a second input of the switch 497. An output of the macroblock-type decision module 420 is connected in signal communication with a third input of the switch 497. The third input of the switch 497 determines whether or not the "data" input of the switch (as compared to the control input, i.e., the third input) is to be provided by the motion compensator 470 or the intra prediction module 460. The output of the switch 497 is connected in signal communication with a second non-inverting input of the combiner 419 and an inverting input of the combiner 485.

A first input of the frame ordering buffer 410 and an input of the encoder controller 405 are available as inputs of the encoder 400, for receiving an input picture. Moreover, a second input of the Supplemental Enhancement Information (SEI) inserter 430 is available as an input of the encoder 400, for receiving metadata. An output of the output buffer 435 is available as an output of the encoder 400, for outputting a bitstream.

Figure 5:
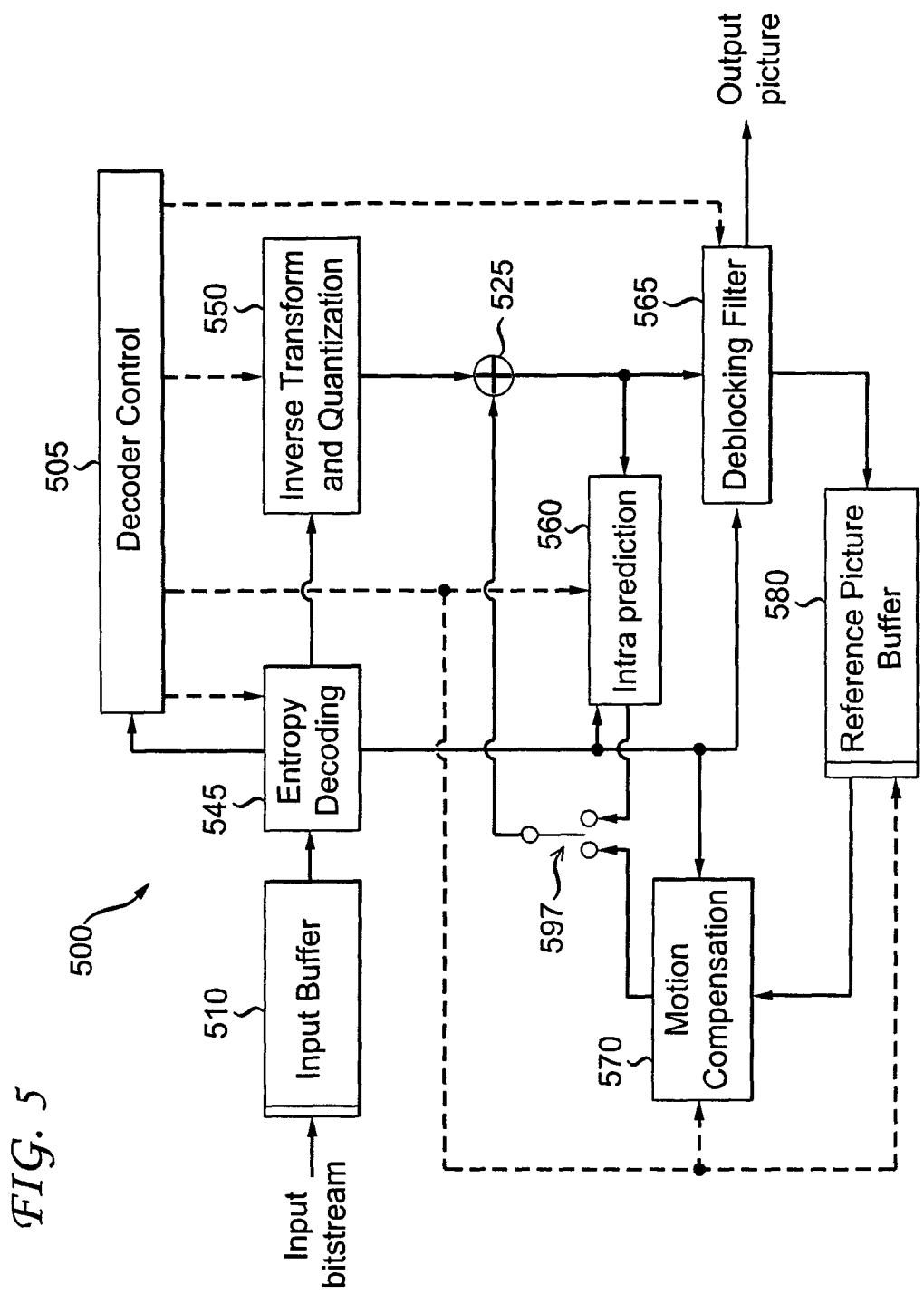
FIG. 5 is a block diagram showing an exemplary video decoder to which the present principles may be applied, in accordance with an embodiment of the present principles.

Turning to FIG. 5, an exemplary video decoder to which the present principles may be applied is indicated generally by the reference numeral 500. The video decoder 500 includes an input buffer 510 having an output connected in signal communication with a first input of an entropy decoder 445. A first output of the entropy decoder 545 is connected in signal communication with a first input of an inverse transformer and inverse quantizer 550. An output of the inverse transformer and inverse quantizer 550 is connected in signal communication with a second non-inverting input of a combiner 525. An output of the combiner 525 is connected in signal communication with a second input of a deblocking filter 565 and a first input of an intra prediction module 560. A second output of the deblocking filter 565 is connected in signal communication with a first input of a reference picture buffer 580. An output of the reference picture buffer 580 is connected in signal communication with a second input of a motion compensator and template matching prediction module 570.

A second output of the entropy decoder 545 is connected in signal communication with a third input of the motion compensator and template matching prediction module 570, a first input of the deblocking filter 565, and a third input of the intra predictor 560. A third output of the entropy decoder 545 is connected in signal communication with an input of a decoder controller 505. A first output of the decoder controller 505 is connected in signal communication with a second input of the entropy decoder 545. A second output of the decoder controller 405 is connected in signal communication with a second input of the inverse transformer and inverse quantizer 550. A third output of the decoder controller 505 is connected in signal communication with a third input of the deblocking filter 565. A fourth output of the decoder controller 505 is connected in signal communication with a second input of the intra prediction module 560, a first input of the motion compensator and template matching prediction module 570, and a second input of the reference picture buffer 580.

An output of the motion compensator and template matching prediction module 570 is connected in signal communication with a first input of a switch 597. An output of the intra prediction module 560 is connected in signal communication with a second input of the switch 597. An output of the switch 597 is connected in signal communication with a first non-inverting input of the combiner 525.

An input of the input buffer 510 is available as an input of the decoder 500, for receiving an input bitstream. A first output of the deblocking filter 565 is available as an output of the decoder 500, for outputting an output picture.

Thus, as noted above, the present principles are directed to methods and apparatus for reduced complexity template matching prediction for video encoding and decoding. It is to be appreciated that the methods and apparatus disclosed herein reduce the decoder complexity while at the same time maintaining the coding efficiency for template matching prediction. In addition, the present principles can also reduce the encoder complexity. As noted above, template matching prediction can gain coding efficiency for both inter and intra prediction by avoiding the transmission of motion/displaced information (motion vectors, reference index, and displaced vectors). However, the disadvantage of template matching prediction is that the same search has to be performed at both the encoder and decoder. This means that the decoder complexity may be greatly increased.

In accordance with the present principles, we disclose methods and apparatus for simplifying template matching prediction by constraining the corresponding settings for template matching prediction. Advantageously, such simplified template matching prediction in accordance with the present principles reduces the decoder complexity. Decoding complexity includes both memory consumption and computational complexity. In particular, in one embodiment of the present principles, we limit template matching prediction to less than sub-pel precision. In another embodiment, we use fewer searching points (i.e., we search fewer positions). In yet another embodiment, we use a simpler sub-pel interpolation scheme.

In general, template matching prediction in accordance with the present principles can be considered to include the following steps:

(1) The TMP search precision is defined.
(2) If the TMP search precision is larger than full-pel precision, then luma/chroma sub-pel positions are interpolated at the TMP precision by the encoder.
(3) Given a target block of a frame, a search is performed by the encoder for optimum pixels from a set of reference samples in the interpolated frame, where the adjacent pixels of the optimum pixels have the highest correlation with those of the target pixels.
(4) The optimum pixels are used as the template matching prediction of the block.

In a first embodiment, we propose to limit template matching prediction to search in a lower sub-pel precision than other regular motion compensation methods. This limitation will not degrade the coding efficiency much, because we will average several best matches obtained from the template matching prediction and it has been found that the average and sub-pel play a similar role in aliasing reduction. In one embodiment, at the encoder, the sub-pel positions are interpolated for the whole frame before the regular motion search and the template matching prediction. The decision between the regular motion search and the template matching prediction is then sent in the bitstream. At the decoder, depending on whether regular motion search or template matching prediction is used, the motion compensation can be performed on the fly for each target block. In a specific sub-embodiment, we limit the template matching prediction search to be allowed only in full-pel precision. For example, in such a case, the interpolation precision can be performed at sub-pel (required by regular motion search for instance), but the TMP search can be limited to full-pet grid only. Thus, if template matching prediction is selected for a block, then no interpolation is required for this block at the decoder. If the chroma resolution is not the same as the luma resolution, for example, in the YUV4:2:0, case, then the chroma motion vector (MV) is half of the luma motion vector and the motion vector search is only performed for luma, since we can approximate the chroma motion vector to the closest full-pel for the case when the chroma motion vector is in half-pel precision.

In a second embodiment, we propose to limit template matching prediction to fewer (less) searching points. In one embodiment, template matching prediction only searches a set of candidate positions. The candidate positions can be in a small search range with a well predicted center (such as the motion vector predictor of the current block), or derived from motion vectors of spatial/temporal neighboring pixels. This is based on the presumption that the current pixels have a high probability of being similar to those of the neighboring pixels, and template matching prediction in general uses those pixels as a template.

In a third embodiment, we propose to use a less complicated sub-pel interpolation method for template matching prediction. In one sub-embodiment, we allow the luma component to be full-pel precision, and the chroma component to be half-pel precision. For half-pel interpolation, a bilinear filter is used. This is based on the theory similar to the first scheme, that the average and sub-pel play a similar role for the aliasing reduction, so we do not require a very complicated sub-pel interpolation filter.

The above schemes can be applied independently or jointly. Moreover, the above schemes can be signaled in a high level syntax such as, for example, a slice header, a picture parameter set (PPS), a sequence parameter set (SPS), a network abstraction layer (NAL) unit header, a supplemental enhancement information (SEI) message, and so forth.

Syntax

TABLE 1 shows exemplary syntax for a slice header, in accordance with an embodiment of the present principles.

TABLE 1

| slice_header( ) { | Descriptor |
|---|---|
| ... | |
| tmp_search_precision_ind | u(v) |
| tmp_search_candidate_ind | u(1) |
| tmp_subpel_interp_flag | u(1) |
| ... | |
| } | |

The semantics of the syntax elements from TABLE 1 will now be described in further detail as follows:

tmp_search_precision_ind equal to 0 specifies to use integer search in template matching, tmp_search_precision_ind equal to 1 specifies to use half-pel search in template matching, tmp_search_precision_ind equal to 2 specifies to use quarter-pel search in template matching.

tmp_search_candidate_ind equal to 0 specifies to use only neighboring motion vectors in template matching, tmp_search_candidate_ind equal to 1 specifies to use for template matching a search range with a well predicted center (such as the motion vector predictor of the current block), or derived from motion vectors of spatial/temporal neighboring pixels.

tmp_subpel_interp_flag equal to 0 specifies to use a bilinear filter in template matching, tmp_subpel_interp_flag equal to 1 specifies to use the same interpolation filter as regular motion compensation.

As an example, a combined approach is utilized. In this approach, YUV4:2:0 is considered, and a motion vector search is performed for only the luma component. We shall limit the motion vector search to full-pel precision and constrain such search to only a small window, with a search range defined from [−2,2]. The search center is defined as the motion vector predictor of the current block as is done in the MPEG-4 AVC Standard. For chroma interpolation, a bilinear filter is used for sub-pel interpolation.

Figure 6:
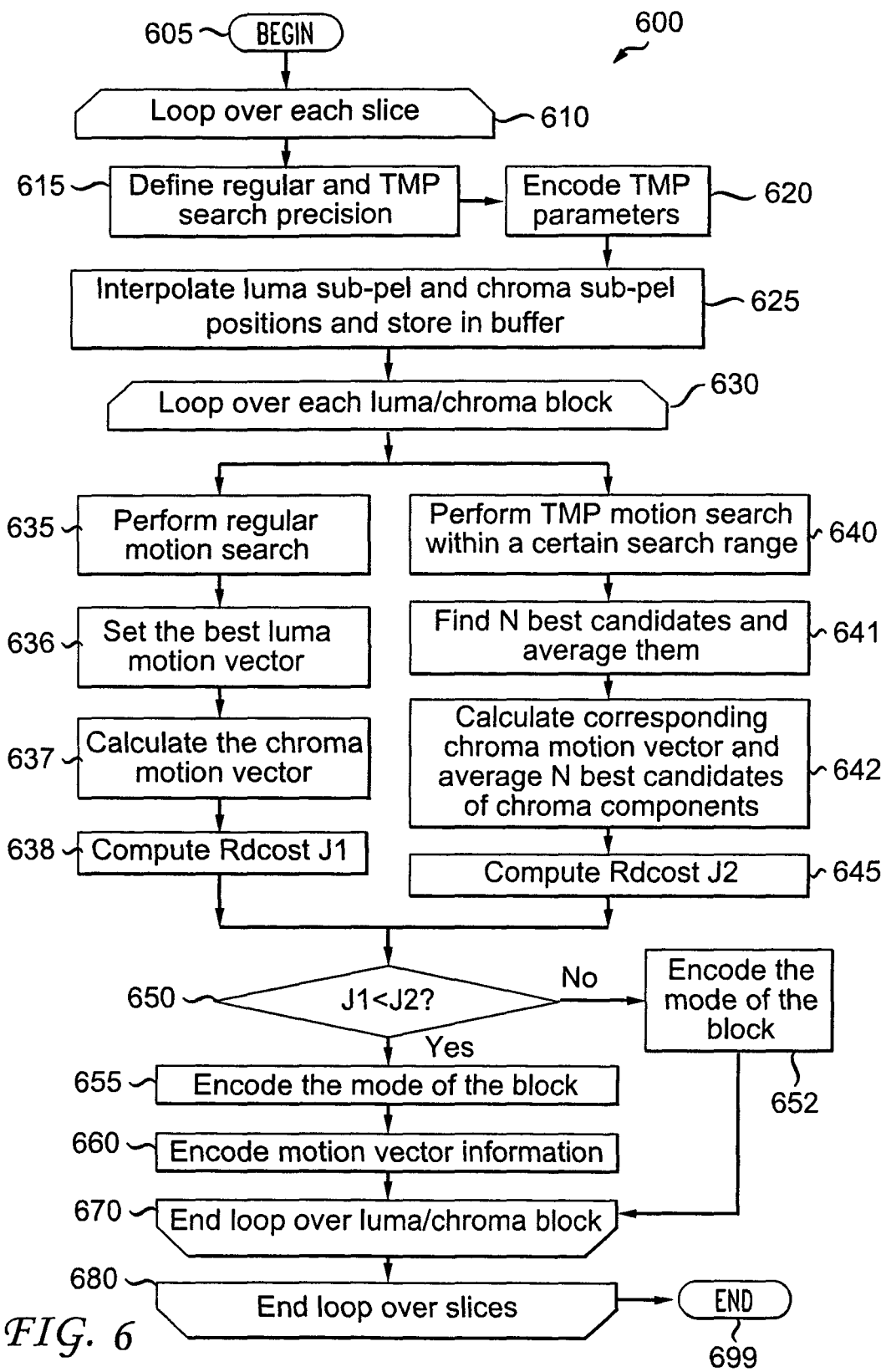
FIG. 6 is a flow diagram showing an exemplary method for encoding image data for a picture using reduced complexity template matching, in accordance with an embodiment of the present principles.

Turning to FIG. 6, an exemplary method for encoding image data for a picture using reduced complexity template matching is indicated generally by the reference numeral 600. The method 600 includes a start block 605 that passes control to a loop limit block 610. The loop limit block 610 begins a loop over each slice, and passes control to a function block 615. The function block 615 defines the regular and template matching prediction (TMP) search precision, and passes control to a function block 620. The function block 620 encodes the TMP parameters, and passes control to a function block 625. The function block 625 interpolates luma sub-pel and chroma sub-pel positions, stores the same in a buffer, and passes control to a loop limit block 630. The loop limit block begins a loop over each luma/chroma block, and passes control to a function bloc 635 and a function block 640. The function block 635 performs a regular motion search, and passes control to a function block 636. The function block 636 sets the best luma motion vector, and passes control to a function block 637. The function block 637 calculates the chroma motion vector, and passes control to a function block 638. The function block 638 computes the RDcost J1, and passes control to a decision block 650. The function block 640 performs a template matching prediction search within a certain search range, and passes control to a function block 641. The function block 641 finds the N best candidates and averages them, and passes control to a function block 642. The function block 642 calculates the corresponding chroma motion vector and average N best candidates of the chroma components, and passes control to a function block 645. The function block 645 computes the RDcost J2, and passes control to the decision block 650. The decision block 650 determines whether or not J1<J2. If so, then control is passed to a function block 655. Otherwise, control is passed to a function block 652. The function block 655 encodes the mode information, and passes control to the function block 660. The function block 660 encodes the motion vector (MV) of the block, and passes control to a loop limit block 670. The function block 652 encodes the mode of the block, and passes control to a loop limit block 670. The loop limit block 670 ends the loop over each luma/chroma block, and passes control to a loop limit block 680. The loop limit block 680 ends the loop over the slices, and passes control to a function block 699.

Figure 7:
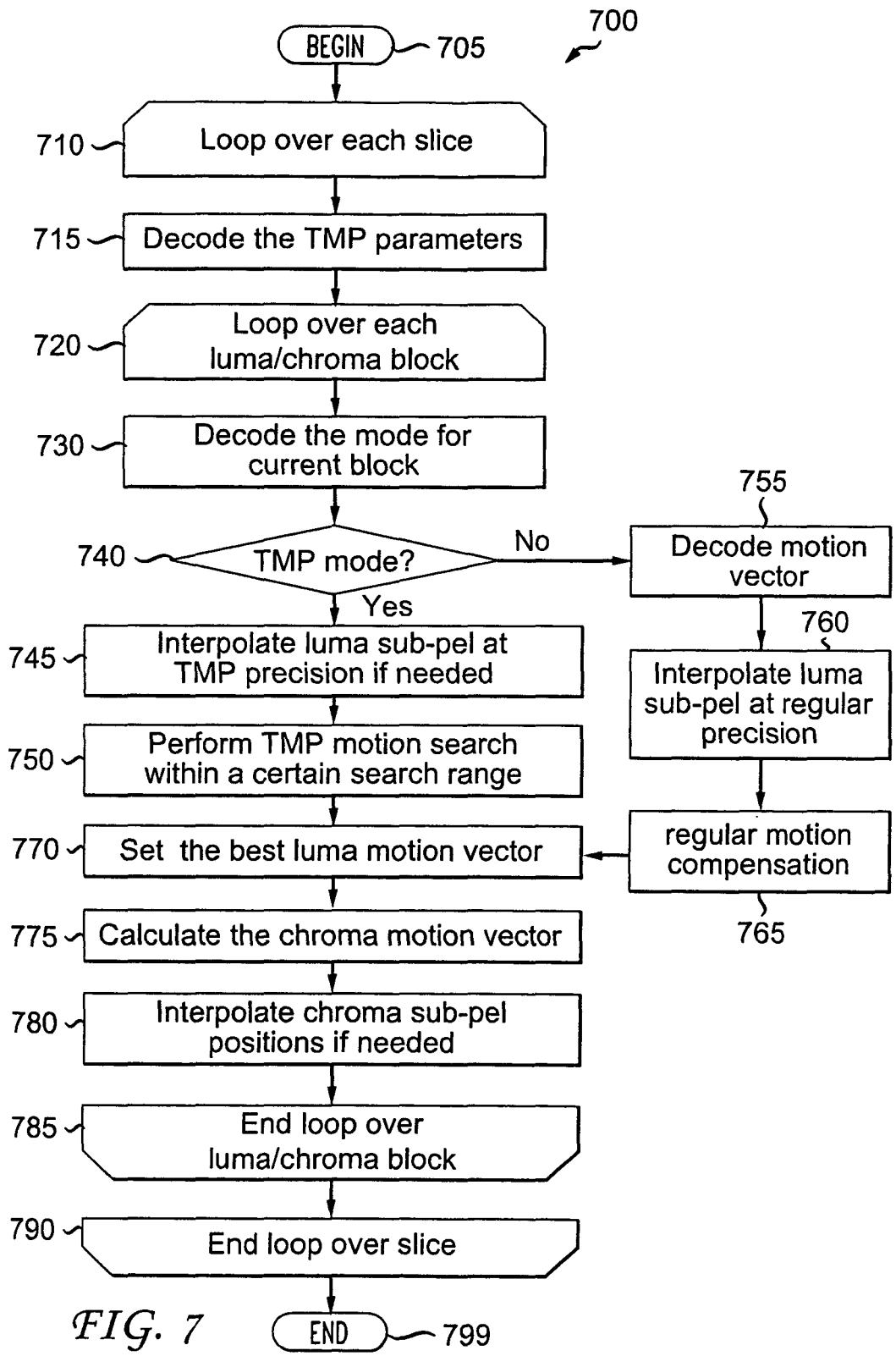
FIG. 7 is a flow diagram showing an exemplary method for decoding image data for a picture using reduced complexity template matching, in accordance with an embodiment of the present principles.

Turning to FIG. 7, an exemplary method for decoding image data for a picture using reduced complexity template matching is indicated generally by the reference numeral 700. The method 700 includes a start block 705 that passes control to a loop limit block 710. The loop limit block 710 begins a loop over each slice, and passes control to a function block 715. The function block 715 decodes the TMP parameters, and passes control to a loop limit block 720. The loop limit block 720 begins a loop over each luma/chroma block, and passes control to a function block 730. The function block 730 decodes the mode for the current block, and passes control to a decision block 740. The decision block 740 determines whether or not the current mode is TMP mode. If so, then control is passed to a function block 745. Otherwise, control is passed to a function block 755. The function 745 interpolates luma sub-pel positions at TMP precision if the TMP precision is larger than full-pel precision, and passes control to a function block 750. The function block 750 performs a TMP motion search within a certain search range, and passes control to a function block 770. The function block 770 sets the best luma motion vector, and passes control to a function block 775. The function block 775 calculates the chroma motion vector, and passes control to a function block 780. The function block 780 interpolates chroma sub-pel positions if the chroma motion vector precision is larger than full-pel precision, and passes control to a loop limit block 785. The function block 785 ends the loop over each luma/chroma block, and passes control to a loop limit block 790. The loop limit block 790 ends the loop over each slice, and passes control to an end block 799. The function block 755 decodes a motion vector, and passes control to a function block 760. The function block 760 interpolates luma sub-pel at regular precision, and passes control to a function block 765. The function block 765 performs regular motion compensation, and passes control to the function block 770.

A description will now be given of some of the many attendant advantages/features of the present invention, some of which have been mentioned above. For example, one advantage/feature is an apparatus having a video encoder for encoding at least an image block in a picture using template matching prediction. The template matching prediction is selectably constrained using one or more constraining criterion that reduces a complexity of performing the template matching prediction.

Another advantage/feature is the apparatus having the video encoder as described above, wherein the one or more constraining criterion includes constraining a template matching prediction motion vector search performed for the template matching prediction to a lower sub-pel precision than a precision used by a standard motion estimation method corresponding to at least one of an existing video coding standard and an existing video coding recommendation and constraining the template matching prediction motion vector search performed for the template matching prediction to the lower sub-pel precision than the precision used by coding modes in at least one of the existing video coding standard and the existing video coding recommendation that lack a required motion search at a corresponding decoder.

Yet another advantage/feature is the apparatus having the video encoder wherein the one or more constraining criterion includes constraining a template matching prediction motion vector search performed for the template matching prediction to a lower sub-pel precision than a standard motion estimation method corresponding to at least one of an existing video coding standard and an existing video coding recommendation as described above, wherein sub-pel positions are interpolated for an entirety of the picture before performing any of the template matching prediction motion vector search and the standard motion estimation method, at least some of the interpolated sub-pel positions being used for the template matching prediction motion vector search.

Still another advantage/feature is the apparatus having the video encoder wherein sub-pel positions are interpolated for an entirety of the picture before performing any of the template matching prediction motion vector search and the standard motion estimation method, at least some of the interpolated sub-pel positions being used for the template matching prediction motion vector search as described above, wherein a decision is made between encoding the image block using a result of the template matching prediction motion vector search or encoding the image block using a result of the standard motion estimation method, and a result of the decision is encoded for transmission to a corresponding decoder.

Moreover, another advantage/feature is the apparatus having the video encoder as described above, wherein the one or more constraining criterion includes constraining the template matching prediction to search fewer positions than a motion estimation method that is performed in conjunction with a standard motion estimation method corresponding to at least one of an existing video coding standard and an existing video coding recommendation.

Further, another advantage/feature is the apparatus having the video encoder wherein the one or more constraining criterion includes constraining the template matching prediction to search fewer positions than a standard motion estimation method corresponding to at least one of an existing video coding standard and an existing video coding recommendation as described above, wherein the fewer positions correspond to a search range, wherein a center of the search range corresponds to a motion vector predictor of the image block.

Also, another advantage/feature is the apparatus having the video encoder wherein the one or more constraining criterion includes constraining the template matching prediction to search fewer positions than a standard motion estimation method corresponding to at least one of an existing video coding standard and an existing video coding recommendation as described above, wherein the fewer positions are determined by motion vectors of at least one of spatial neighboring pixels and temporal neighboring pixels with respect to the image block.

Additionally, another advantage/feature is the apparatus having the video encoder as described above, wherein the one or more constraining criterion comprises constraining the template matching prediction to use a less complex sub-pel interpolation scheme for a template matching prediction motion vector search performed for the template matching prediction than a standard interpolation scheme corresponding to at least one of an existing video coding standard and an existing video coding recommendation.

Moreover, another advantage/feature is the apparatus having the video encoder wherein the one or more constraining criterion includes constraining a template matching prediction motion vector search performed for the template matching prediction to a lower sub-pel precision than a precision used by a standard motion estimation method corresponding to at least one of an existing video coding standard and an existing video coding recommendation and constraining the template matching prediction motion vector search performed for the template matching prediction to the lower sub-pel precision than the precision used by coding modes in at least one of the existing video coding standard and the existing video coding recommendation that lack a required motion search at a corresponding decoder as described above, wherein a luma component of the image block is interpolated at full-pel precision and a chroma component of the image block is interpolated at half-pel precision.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus, comprising:
a video encoder for encoding at least an image block in a picture using template matching prediction, wherein the template matching prediction is selectably constrained using one or more constraining criterion that reduces a complexity of performing the template matching prediction, wherein the one or more constraining criterion comprises
interpolating sub-pel positions for a frame before performing a regular motion search and template matching prediction, and wherein a decision between the regular motion search and the template matching prediction is then sent in the bitstream; and
constraining the template matching prediction motion vector search performed for the template matching prediction to a full-pel precision and using a sub-pel interpolation precision when using coding modes that do not require motion search at a corresponding decoder in the video coding standard or recommendation, and
averaging a plurality of matches obtained from the template matching prediction.

2. The apparatus of claim 1, wherein the one or more constraining criterion comprises constraining a template matching prediction motion vector search performed for the template matching prediction to a lower sub-pel precision than a precision used by a standard motion compensation method corresponding to at least one of an existing video coding standard and an existing video coding recommendation and constraining the template matching prediction motion vector search performed for the template matching prediction to the lower sub-pel precision than the precision used by coding modes in at least one of the existing video coding standard and the existing video coding recommendation that lack a required motion search at a corresponding decoder.

3. The apparatus of claim 2, wherein sub-pel positions are interpolated for an entirety of the picture before performing any of the template matching prediction motion vector search and the standard motion estimation method, at least some of the interpolated sub-pel positions being used for the template matching prediction motion vector search.

4. The apparatus of claim 3, wherein a decision is made between encoding the image block using a result of the template matching prediction motion vector search or encoding the image block using a result of the standard motion estimation method, and a result of the decision is encoded for transmission to a corresponding decoder.

5. The apparatus of claim 1, wherein the one or more constraining criterion comprises constraining the template matching prediction to search fewer positions than a motion estimation method that is performed in conjunction with a standard motion estimation method corresponding to at least one of an existing video coding standard and an existing video coding recommendation.

6. The apparatus of claim 5, wherein the fewer positions correspond to a search range, wherein a center of the search range corresponds to a motion vector predictor of the image block.

7. The apparatus of claim 5, wherein the fewer positions are determined by motion vectors of at least one of spatial neighboring pixels and temporal neighboring pixels with respect to the image block.

8. The apparatus of claim 1, wherein the one or more constraining criterion comprises constraining the template matching prediction to use a less complex sub-pel interpolation scheme for a template matching prediction motion vector search performed for the template matching prediction than a standard interpolation scheme corresponding to at least one of an existing video coding standard and an existing video coding recommendation.

9. The apparatus of claim 2, wherein a luma component of the image block is interpolated at full-pel precision and a chroma component of the image block is interpolated at half-pel precision.

10. In a video encoder, a method, comprising:
encoding at least an image block in a picture using template matching prediction, wherein the template matching prediction is selectably constrained using one or more constraining criterion that reduces a complexity of performing the template matching prediction, wherein the one or more constraining criterion comprises interpolating sub-pel positions for a frame before performing a regular motion search and template matching prediction, and wherein a decision between the regular motion search and the template matching prediction is then sent in the bitstream; and constraining the template matching prediction motion vector search performed for the template matching prediction to a full-pel precision and using a sub-pel interpolation precision when using coding modes that do not require motion search at a corresponding decoder in the video coding standard or recommendation, and averaging a plurality of matches obtained from the template matching prediction.

11. The method of claim 10, wherein the one or more constraining criterion comprises constraining a template matching prediction motion vector search performed for the template matching prediction to a lower sub-pel precision than a precision used by a standard motion compensation method corresponding to at least one of an existing video coding standard and an existing video coding recommendation and constraining the template matching prediction motion vector search performed for the template matching prediction to the lower sub-pel precision than the precision used by coding modes in at least one of the existing video coding standard and the existing video coding recommendation that lack a required motion search at a corresponding decoder.

12. The method of claim 11, wherein sub-pel positions are interpolated for an entirety of the picture before performing any of the template matching prediction motion vector search and the standard motion estimation method, at least some of the interpolated sub-pel positions being used for the template matching prediction motion vector search.

13. The method of claim 12, wherein a decision is made between encoding the image block using a result of the template matching prediction motion vector search or encoding the image block using a result of the standard motion estimation method, and a result of the decision is encoded for transmission to a corresponding decoder.

14. The method of claim 10, wherein the one or more constraining criterion comprises constraining the template matching prediction to search fewer positions than a motion estimation method that is performed in conjunction with a standard motion estimation method corresponding to at least one of an existing video coding standard and an existing video coding recommendation.

15. The method of claim 14, wherein the fewer positions correspond to a search range, wherein a center of the search range corresponds to a motion vector predictor of the image block.

16. The method of claim 14, wherein the fewer positions are determined by motion vectors of at least one of spatial neighboring pixels and temporal neighboring pixels with respect to the image block.

17. The method of claim 10, wherein the one or more constraining criterion comprises constraining the template matching prediction to use a less complex sub-pel interpolation scheme for a template matching prediction motion vector search performed for the template matching prediction than a standard interpolation scheme corresponding to at least one of an existing video coding standard and an existing video coding recommendation.

18. The method of claim 17, wherein a luma component of the image block is interpolated at full-pel precision and a chroma component of the image block is interpolated at half-pel precision.

19. An apparatus, comprising:

a video decoder for decoding at least an image block in a picture using template matching prediction, wherein the template matching prediction is selectably constrained using one or more constraining criterion that reduces a complexity of performing the template matching prediction, wherein the one or more constraining criterion comprises interpolating sub-pel positions for a frame before performing a regular motion search and template matching prediction, and wherein a decision between the regular motion search and the template matching prediction is then sent in the bitstream; and constraining the template matching prediction motion vector search performed for the template matching prediction to a full-pel precision and using a sub-pel interpolation precision when using coding modes that do not require motion search at a corresponding decoder in the video coding standard or recommendation, and averaging a plurality of matches obtained from the template matching prediction.

20. The apparatus of claim 19, wherein the one or more constraining criterion comprises constraining a template matching prediction motion vector search performed for the template matching prediction to a lower sub-pel precision than a precision used by a standard motion compensation method corresponding to at least one of an existing video coding standard and an existing video coding recommendation and constraining the template matching prediction motion vector search performed for the template matching prediction to the lower sub-pel precision than the precision used by coding modes in at least one of the existing video coding standard and the existing video coding recommendation that lack a required motion search at a corresponding decoder.

21. The apparatus of claim 20, wherein a result of a decision between encoding the image block using a result of the template matching prediction motion vector search or encoding the image block using a result of the standard motion estimation method is decoded, the result used by said video decoder to determine whether to apply the template matching prediction motion vector search or the standard motion estimation method to decode the image block.

22. The apparatus of claim 21, wherein the template matching prediction motion vector search is only permitted in full-pel resolution when the result of the decision indicates that the image block was encoded using the result of the template matching prediction motion vector search.

23. The apparatus of claim 19, wherein the one or more constraining criterion comprises constraining the template matching prediction to search fewer positions than a motion estimation method that is performed in conjunction with a standard motion estimation method corresponding to at least one of an existing video coding standard and an existing video coding recommendation.

24. The apparatus of claim 23, wherein the fewer positions correspond to a search range, wherein a center of the search range corresponds to a motion vector predictor of the image block.

25. The apparatus of claim 23, wherein the fewer positions are determined by motion vectors of at least one of spatial neighboring pixels and temporal neighboring pixels with respect to the image block.

26. The apparatus of claim 19, wherein the one or more constraining criterion comprises constraining the template matching prediction to use a less complex sub-pel interpolation scheme for a template matching prediction motion vector search performed for the template matching prediction than a standard interpolation scheme corresponding to at least one of an existing video coding standard and an existing video coding recommendation.

27. The apparatus of claim 26, wherein a luma component of the image block is interpolated at full-pel precision and a chroma component of the image block is interpolated at half-pel precision.

28. In a video decoder, a method, comprising:
    decoding at least an image block in a picture using template matching prediction, wherein the template matching prediction is selectably constrained using one or more constraining criterion that reduces a complexity of performing the template matching prediction, wherein the one or more constraining criterion comprises
    interpolating sub-pel positions for a frame before performing a regular motion search and template matching prediction, and wherein a decision between the regular motion search and the template matching prediction is then sent in the bitstream; and
    constraining the template matching prediction motion vector search performed for the template matching prediction to a full-pel precision and using a sub-pel interpolation precision when using coding modes that do not require motion search at a corresponding decoder in the video coding standard or recommendation, and
    averaging a plurality of matches obtained from the template matching prediction.

29. The method of claim 28, wherein the one or more constraining criterion comprises constraining a template matching prediction motion vector search performed for the template matching prediction to a lower sub-pel precision than a precision used by a standard motion compensation method corresponding to at least one of an existing video coding standard and an existing video coding recommendation and constraining the template matching prediction motion vector search performed for the template matching prediction to the lower sub-pel precision than the precision used by coding modes in at least one of the existing video coding standard and the existing video coding recommendation that lack a required motion search at a corresponding decoder.

30. The method of claim 29, wherein a result of a decision between encoding the image block using a result of the template matching prediction motion vector search or encoding the image block using a result of the standard motion estimation method is decoded, the result used by said video decoder to determine whether to apply the template matching prediction motion vector search or the standard motion estimation method to decode the image block.

31. The method of claim 30, wherein the template matching prediction motion vector search is only permitted in full-pel resolution when the result of the decision indicates that the image block was encoded using the result of the template matching prediction motion vector search.

32. The method of claim 28, wherein the one or more constraining criterion comprises constraining the template matching prediction to search fewer positions than a motion estimation method that is performed in conjunction with a standard motion estimation method corresponding to at least one of an existing video coding standard and an existing video coding recommendation.

33. The method of claim 32, wherein the fewer positions correspond to a search range, wherein a center of the search range corresponds to a motion vector predictor of the image block.

34. The method of claim 32, wherein the fewer positions are determined by motion vectors of at least one of spatial neighboring pixels and temporal neighboring pixels with respect to the image block.

35. The method of claim 28, wherein the one or more constraining criterion comprises constraining the template matching prediction to use a less complex sub-pel interpolation scheme for a template matching prediction motion vector search performed for the template matching prediction than a standard interpolation scheme corresponding to at least one of an existing video coding standard and an existing video coding recommendation.

36. The method of claim 35, wherein a luma component of the image block is interpolated at full-pel precision and a chroma component of the image block is interpolated at half-pel precision.

37. A non-transitory computer readable storage media having video signal data encoded thereupon, comprising:
    at least an image block in a picture encoded using template matching prediction, wherein the template matching prediction is selectably constrained using one or more constraining criterion that reduces a complexity of performing the template matching prediction, wherein the one or more constraining criterion comprises
    interpolating sub-pel positions for a frame before performing a regular motion search and template matching prediction, and wherein a decision between the regular motion search and the template matching prediction is then sent in the bitstream; and
    constraining the template matching prediction motion vector search performed for the template matching prediction to a full-pel precision and using a sub-pel interpolation precision when using coding modes that do not require motion search at a corresponding decoder in the video coding standard or recommendation, and
    averaging a plurality of matches obtained from the template matching prediction.

* * * * *